United States Patent [19]
Berg

[11] Patent Number: 4,944,610
[45] Date of Patent: * Jul. 31, 1990

[54] BEARING SEAL AND RETAINER

[75] Inventor: Dennis G. Berg, East Rockaway, N.Y.

[73] Assignee: Winfred M. Berg, Inc, E. Rockaway, N.Y.

[*] Notice: The portion of the term of this patent subsequent to Sep. 29, 2006 has been disclaimed.

[21] Appl. No.: 325,891

[22] Filed: Mar. 20, 1989

Related U.S. Application Data

[63] Continuation of Ser. No. 676,290, Nov. 29, 1984, Pat. No. 4,869,602.

[51] Int. Cl.$^5$ .............................................. F16C 33/74
[52] U.S. Cl. ..................................... 384/147; 384/130
[58] Field of Search ............... 384/147, 484, 488, 148, 384/903, 130

[56] References Cited

U.S. PATENT DOCUMENTS

| | | | |
|---|---|---|---|
| 2,031,571 | 2/1936 | Nilsson | 384/488 |
| 3,806,212 | 4/1974 | Piva | 384/484 |
| 3,846,995 | 11/1974 | Mangiavacchi | 384/147 |

*Primary Examiner*—Lenard A. Footland
*Attorney, Agent, or Firm*—Stoll, Previto & Hoffman

[57] ABSTRACT

A bearing retainer and seal is described which is snapped into locking engagement on a bearing mounted in a pillow block. The retainer includes an interior circular locking flange which snaps into locking grooves on the outer surfaces of the bearings whereby a pair of the retainers cooperate to lock the bearing in position in a pillow block or other bearing support. The retainer shaft opeining has an integral wiping seal at its edge both to seal the bearing for excluding foreign matter and also for retaining lubrication within the bearing.

2 Claims, 3 Drawing Sheets

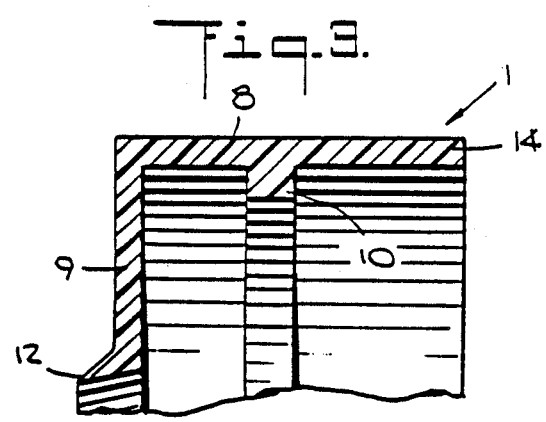
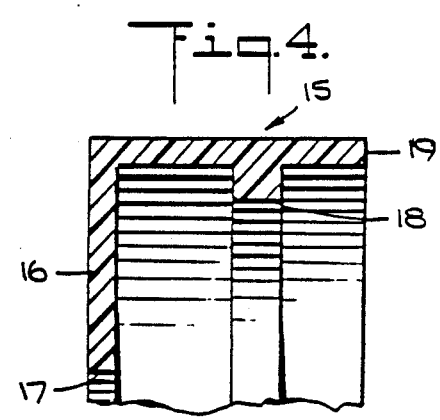
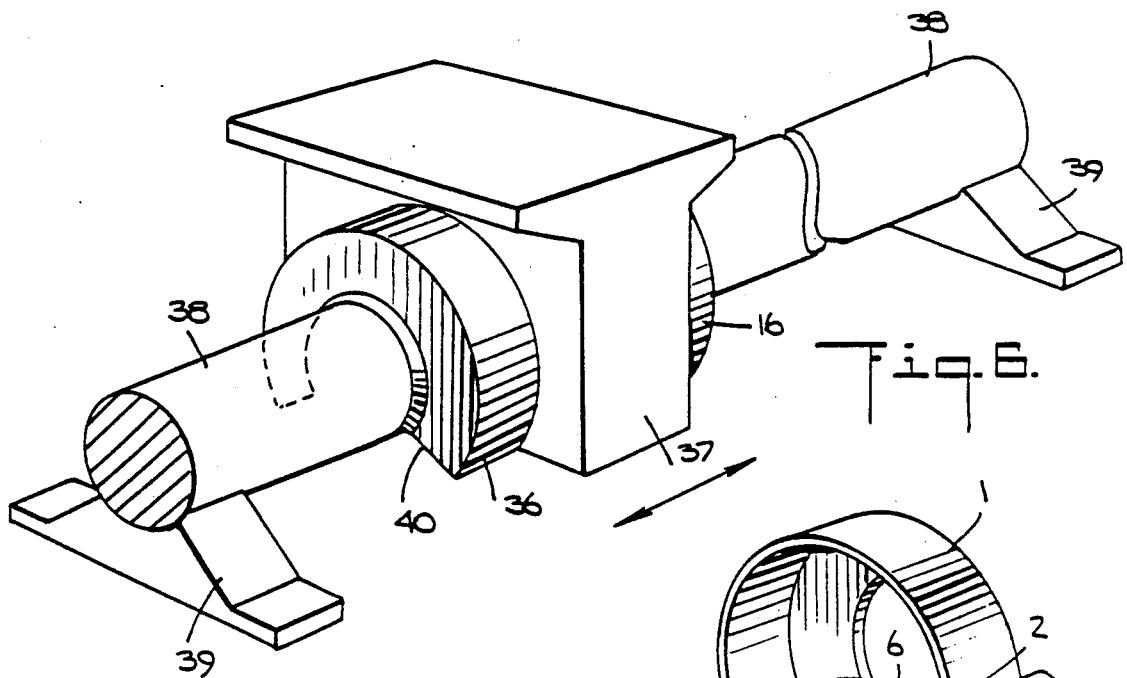
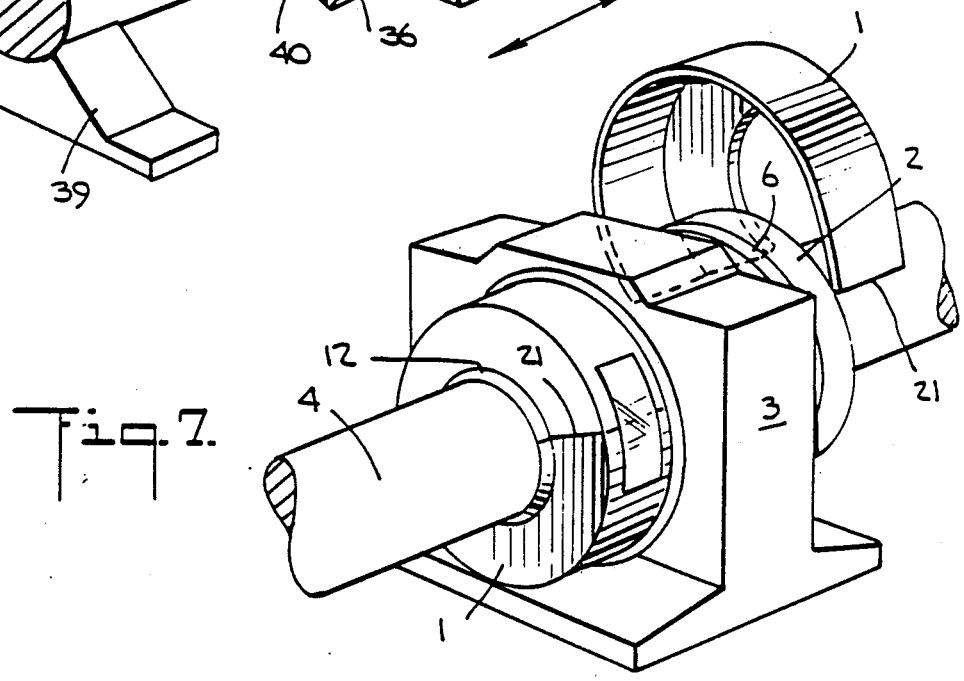

BEARING SEAL AND RETAINER

RELATED APPLICATION

This application is a continuation of pending U.S. patent application Ser. No. 676,290 filed Nov. 29, 1984.

BACKGROUND OF THE INVENTION

The present invention relates to an improved bearing retainer and more particularly to a plastic combined bearing seal and retainer.

It is very common practice to mount either reciprocating and/or rotating shafts in bearings which are themselves supported by pillow blocks or other mountings. After the bearing is positioned within the pillow block it is necessary to lock the bearing in place in the pillow block and also to provide a seal for isolating the operating surfaces of the bearing from outside contaminents and for retaining lubrication within the bearing.

Presently used devices for this purpose comprise metallic locking rings which are positioned in locking slots at the bearing ends and separate seals or wipers mounted at the opposite ends of the bearing consisting of ring-like metal housings incorporating sealing or wiper rings. This construction requires four separate elements in typical bearing applications, as well as, as many as, four distinct manipulations for mounting the bearings in the pillow blocks and for applying suitable bearing seals.

The retainer and seal of the present invention is a unitary ring-like member which simultaneously performs both the locking and sealing functions. Because of its unitary construction, the locking and the sealing are done by a single snap-on application with two retainers making up a locking pair. Additionally, when the retainer is of a soft molded plastic, it may be removed from the bearing for replacement or inspection by simply slitting the retainer with a knife or razor and slipping it clear of the bearing and shaft without requiring the shaft to be removed from the bearing or pillow block. Similarly, the retainer may be reapplied or a new retainer and seal snapped into place in the same manner by cutting it so that it may be slipped over the shaft and the cut may be repaired with a suitable tape or an adhesive.

Accordingly, an object of the present invention is to provide an improved bearing seal and retainer.

Another object of the present invention is to provide a unitary molded plastic bearing retainer which also acts as a bearing seal.

Another object of the present invention is to provide a unitary bearing retainer and seal which is easily snapped into place initially and which may be thereafter removed and replaced without requiring the supported shaft to be removed from the bearing and the pillow block.

Another object of the present invention is to provide a flexible plastic bearing retainer which incorporates a self locking feature.

Other and further objects of the present invention will become apparent upon an understanding of the illustrative embodiments about to be described, or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 4 is a corresponding sectional view of an alternative embodiment.

FIG. 5 is a side elevational view partially in section illustrating a pair of retainers in accordance with the invention locking a typical bearing in place in a pillow block.

FIG. 6 is a perspective view of a slotted embodiment of a retainer in accordance with the present invention.

FIG. 7 is a perspective view illustrating the removal from or placement of a retainer on a bearing with a shaft in place.

DESCRIPTION OF THE PREFERRED EMBODIMENT

Figure 1:
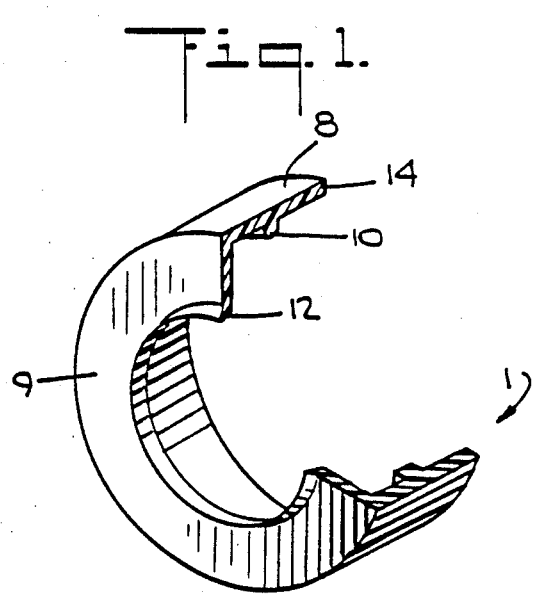
FIG. 1 is a perspective view of a preferred embodiment of the bearing seal and retainer in accordance with the present invention.

A preferred embodiment of a sealing retainer in accordance with the invention is illustrated in FIGS. 1 thru 3 and 5. The retainer 1 is a unitary ring which may be molded or cast of a plastic such as polyurethane or a variety of other plastics or materials which may be molded, cast or machined in form retaining and flexible form so that the retainer 1 may be snapped in place as described below. Two retainers 1 are shown in FIG. 5 locking a bearing 2 in place in a pillow block 3 for mounting an elongated shaft 4. FIG. 5 illustrates a typical arrangement for a shaft 4 which may either be a reciprocating and/or rotating shaft supported by the bearing 2. The bearing 2 is mounted in a suitable pillow block 3.

The bearing 2, as is common practice, includes a pair of spaced circular locking grooves 6 positioned at the opposite ends of the bearing 2 axially outwardly of the spaced faces 7 of the pillow block 3. A pair of retainers 1 are illustrated as locked into place on the bearing 2 at the opposite faces 7 of the pillow block 3 to contain or lock the bearing 2 in place in the pillow block 3.

Each of the retainers 1 is a molded unitary plastic article with an outer cylindrical body portion 8 having depending end portions 9. Radially inwardly projecting locking flanges 10 are formed on the body portion 8 which are snapped into and which are in locking engagement with the spaced grooves 6 in the bearing 2. The innermost edges of the end portions 9 are dimensioned to extend to a position adjacent to the shaft 4 where flared and pointed flexible sealing edges 12 are in sliding or rotating engagement with the shaft 4.

Figure 2:
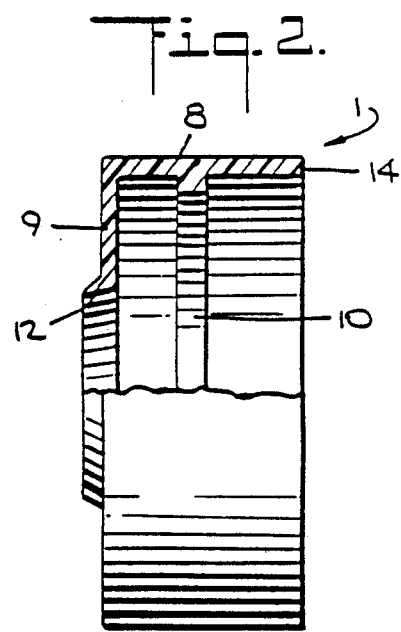
FIG. 2 is a side elevational view, partially cut away of retainer of FIG. 1.
Figure 3:
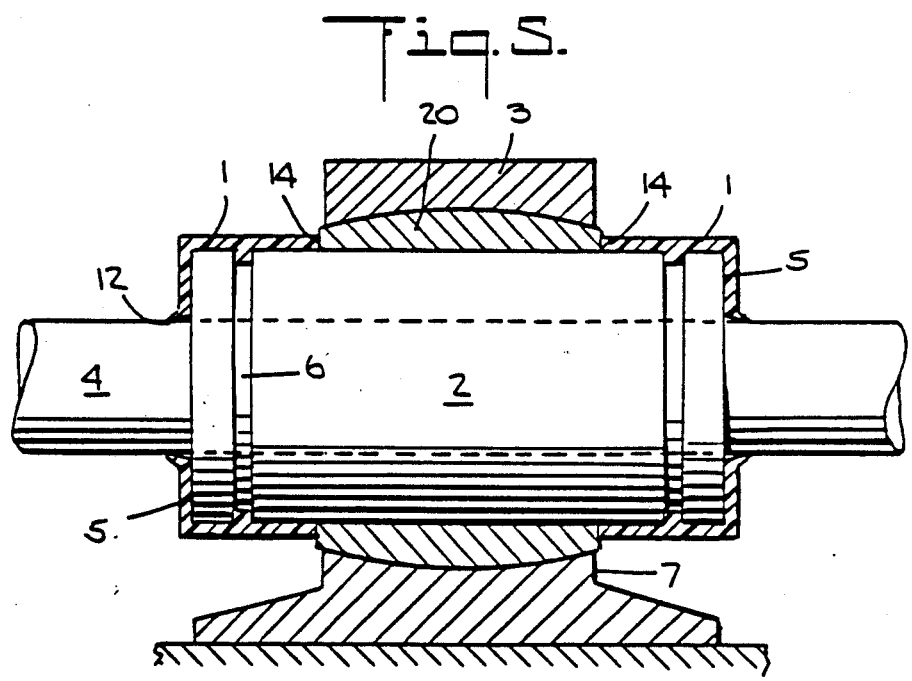
FIG. 3 is an enlarged partial sectional view of the retainer.

FIGS. 1 thru 3 are detailed illustrations of a preferred embodiment of the retainer 1. FIG. 1 illustrates a generally cylindrical form of the retainer 1 which is useful for most bearings of the type used for cylindrical shafting. In particular instances it is possible for the overall general shape to have other form such as an oval or possibly square form, depending upon the particular shaft and bearing combination used.

Each retainer 1 has a ring-like outer body portion 8 terminating at one end in a radially inwardly directed end portion 9. In a preferred embodiment, the end portion 9 terminates at a shaft opening in an integral and flexible shaft wiper and sealing element 12. In order to effectively perform the wiping and sealing functions, the sealing element 12 preferably has a flared or pointed cross-section as best illustrated in FIGS. 2, 3, and 5. The sealing element 12 of the retainer 1 is in sliding, sealing or wiping engagement with the shaft 4 during the shaft rotation and/or reciprocation. The end portion 9 is arranged to extend radially inwardly at the generally flat bearing end surfaces 5.

Integrally formed on the center surface of the retainer body portion 8 is a locking flange 10. The locking flange 10 preferably is proportioned to fit snuggly within a bearing groove 6 to provide the locking action between the retainer 1 and the bearing 2. A cross-section of the retainer 1 is illustrated in FIG. 3 showing the seal 12 on the end portion 9 and the flange 10 on the body portion 8. The dimensions of the end portion 9 of the body portion 8 preferably are set to cause the retainers 1 to firmly engage the pillow block 3.

FIG. 4 illustrates an alternative retainer shape. As illustrated in this cross-sectional view, the end portion 16 of a retainer 15 is formed without a wiping element on its edge 17 where the particular use of the retainer 15 makes the seal unnecessary. The retainer 15 also has a different proportioning of the spacing of a locking flange 18 and the length of the retainer abutment portion 19.

FIG. 5 illustrates two retainers 1 in position to mount the shaft 4 in bearing 2 on a pillow block 3. This combination is assembled by mounting the bearing 2 within operational bearing ring 20 in the pillow block 3 with the shaft 4 positioned in the bearing 2. The two retainers 1 are slipped over the shaft 4 and pressed together over the opposite ends of the bearing 2 causing the locking flanges 10 to snap into position in the bearing grooves 6 and with the abutment end portions 14 of the two retainers 1 confining the bearing 2 in position on the pillow block 3. The shaft 4 may reciprocate and/or rotate. The retainer rings 1 may also act as a bumper means to protect the bearing 2 against damaging contact with stationary members adjacent to the shaft 4. The wiper edges 12 are in sliding engagement with the shaft 4 and in this position they block the entry of contaminents or foreign matter into the bearing 2 and simultaneously act as a seal to confine any lubricants employed within the bearing 2.

FIG. 6 illustrates another embodiment in retainers 36 employed on a bearing mounted in a moving pillow block 37 which has a sliding action along stationery runners 38. In this embodiment, the stationery runner mounts 39 are bypassed by the moving pillow block 37. Suitable slots 40 are provided for this purpose in the retainers 36 and similar slots or cut-outs are provided in the bearing and pillow block 37. The retainers 36 are otherwise similar to retainer 1 described above.

Figure 8:
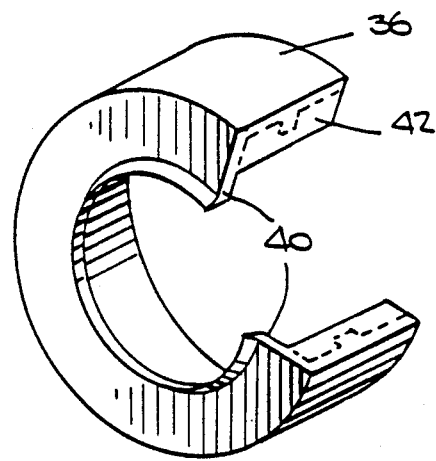
FIG. 8 is a perspective view of the slotted retainer.

A pair of end flaps 42 (FIG. 8) are positioned adjacent to the slots 40 in retainer 36 for engaging the bearing and for assisting in keeping the retainer 36 locked in place on the bearing.

FIG. 7 is a perspective view illustrating the removal of retainers 1 from a shaft 4 by cutting slits 21 axially of the retainers. The flexible retainers 1 may then be slipped off the shaft 4 for inspection or replacement. A retainer 1 may be replaced without removing the shaft 4 by forming a similar slit 21 in a new retainer 1 and by snapping it over the shaft 4 and by repairing the slit 21 using tape 22 or adhesive or other fastening means.

Figure 9:
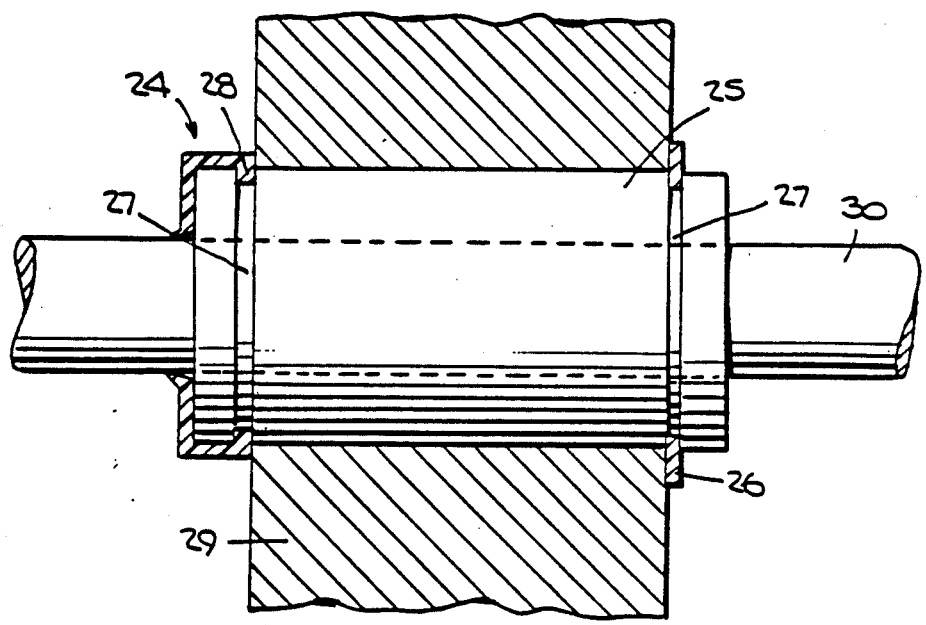
FIG. 9 is a side elevational view, partially in section of another embodiment.

FIG. 9 illustrates another embodiment of a retainer 24 positioned on a bearing 25 for a shaft 30. FIG. 9 also illustrates the use of a retainer 24 on one end of the bearing 25 and the use of a regular locking ring 26 on the opposite end of the bearing 25. The locking ring 26 has been snapped into place in the bearing slot 27. This embodiment of the retainer 24 has the abutment portion terminated at the locking flange 28 so that the abutment portion of the retainer 24 abutting the bearing block 29 comprises the outer surface of the locking flange 28. Retainers, such as the retainer 24 may be used on one end of a bearing 25 as illustrated, or may also be used in pairs on the opposite ends of a bearing in the manner described above for the other embodiments of the bearing retainer where no locking ring is used.

It will be seen that an improved unitary retainer has been provided for bearing installations which is simple, effective and easily installed and which also has the advantage of being replaceable without disassembling the bearing and shaft arrangement. The retainers are easily manufactured by molding or casting or machining and replace prior devices of considerably greater complexity and difficulty of manufacture.

As various changes may be made in the form, construction and arrangement of the invention and without deparing from the spirit and scope of the invention, and without sacrificing any of its advantages, it is to be understood that all matter herein is to be interpreted as illustrative and not in a limiting sense.

Having thus described my invention, I claim:

1. A unitary flexible molded plastic bearing retainer for retaining a bearing in a bearing mounting with the bearing having faces at its opposite ends and spaced locking grooves adjacent to said ends comprising a hollow generally cylindrical body member proportioned for at least partially surrounding the bearing and extending axially of the bearing and having a radially inwardly extending end portion on one end of the body member with a shaft opening and positioned for engaging a bearing end face, a flexible sealing element on said end portion at said shaft opening for sliding sealing engagement with the shaft, an abutment portion on the opposite end of said body member for abutting the bearing mounting, a radially inwardly extending locking flange on the inner surface of the hollow body member for engaging one of said locking groove in the bearing, said sealing element having a generally tapered cross-section with its thinner portion positioned at a shaft retained by said bearing, and said locking flange having a cross-section complementary to the cross-section of the said locking grooves.

2. The bearing retainer as claimed in claim 1 in which said plastic comprises polyurethane.

* * * * *